United States Patent [19]

Dietrichs et al.

[11] 4,160,695

[45] Jul. 10, 1979

[54] PROCESS FOR THE PRODUCTION OF GLUCOSE FROM CELLULOSE-CONTAINING VEGETABLE RAW MATERIALS

[75] Inventors: Hans-Hermann Dietrichs, Reinbek; Michael Sinner, Dassendorf; Fritz Opderbek, Münich; Karl-Heinz Brachthäuser, Ratingen, all of Fed. Rep. of Germany

[73] Assignee: Projektierung Chemische Verfahrenstechnik Gesellschaft mit beschrankter Haftung, Dusseldorf, Fed. Rep. of Germany

[21] Appl. No.: 816,463

[22] Filed: Jul. 18, 1977

[30] Foreign Application Priority Data

Jul. 20, 1976 [AT] Austria ................................ 5345/76

[51] Int. Cl.[2] ........................ C12D 13/02; C13K 1/02

[52] U.S. Cl. ........................................ 435/101; 127/37

[58] Field of Search ........................... 195/8, 9, 33, 39; 127/37, 36; 162/14

[56] References Cited

U.S. PATENT DOCUMENTS

| | | | |
|---|---|---|---|
| 2,198,785 | 4/1940 | Mohr et al. | 127/37 |
| 3,565,687 | 2/1971 | Suminoe et al. | 127/37 |
| 3,640,768 | 2/1972 | Eickemeyer | 127/37 |
| 4,018,620 | 4/1977 | Penque | 127/37 |

FOREIGN PATENT DOCUMENTS

| | | | |
|---|---|---|---|
| 933028 | 9/1973 | Canada | 426/807 |

OTHER PUBLICATIONS

Mandels et al., "Enzymatic Hydrolysis of Waste Cellulose", *Biotechnology and Bioengineering,* vol. 16, (1974), pp. 1471–1493.

*Primary Examiner*—Thomas G. Wiseman

*Attorney, Agent, or Firm*—Donald D. Jeffery

[57] ABSTRACT

A process for the production of glucose from cellulose containing raw material by steam treatment at a temperature from 160° to 230° C. for from 2 minutes to 4 hours followed by lixiviation with aqueous alkali and acid or enzymatic hydrolysis of fibrinous residue.

6 Claims, 2 Drawing Figures

Figure 1:
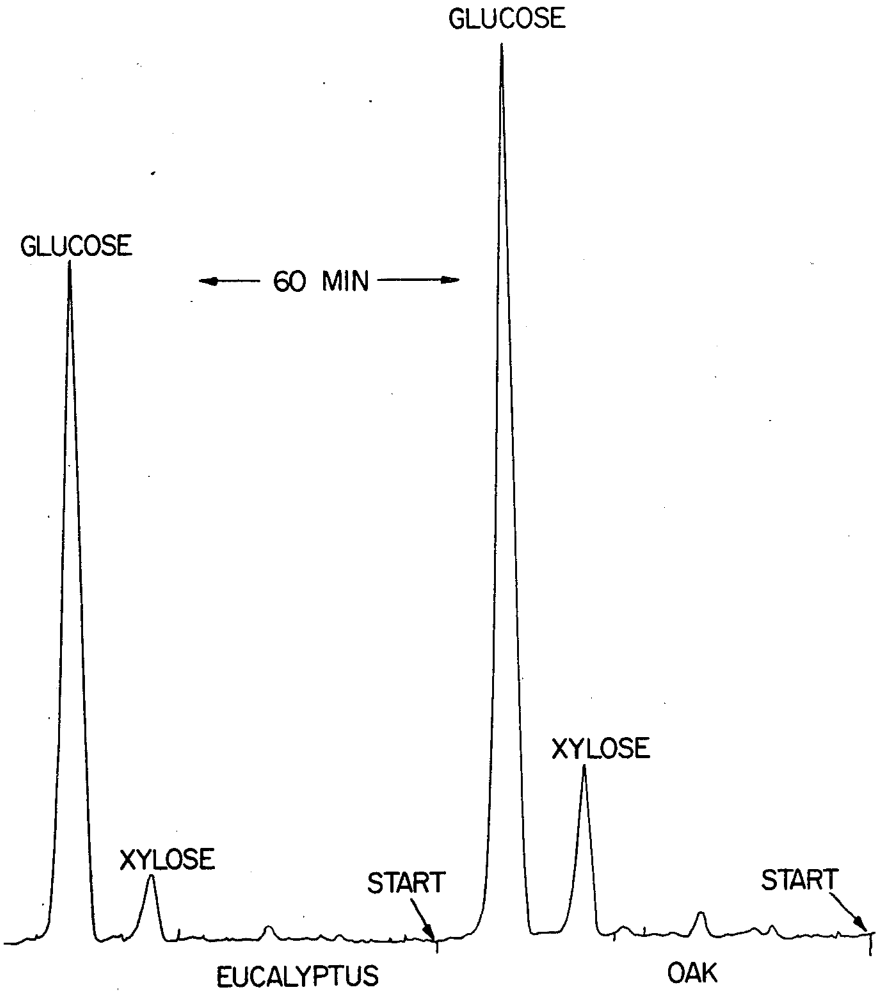

PROCESS FOR THE PRODUCTION OF GLUCOSE FROM CELLULOSE-CONTAINING VEGETABLE RAW MATERIALS

The present invention relates to a process for obtaining glucose from cellulose-containing vegetable raw material which can be disintegrated by steam pressure treatment.

Processes are known for disintegrating cellulose-containing raw materials in order to obtain and work up products contained in the raw material, particularly in wood. According to the nature of the desired product, various methods are used. In general these are disintegrating processes using chemicals, under the influence of which the cell wall bonds are loosened or cementing substances dissolved, so that the fibrous structure of the cellulose fraction can be exposed by defibrination and supplied in this form for use as raw material for e.g. boards, paper etc. According to the disintegration conditions the substances associated with the cellulose are removed, so that pure cellulose is available for further processing to e.g. artificial silk, artificial wool etc. The associated substances which are separated off are obtained in dissolved form and are destroyed.

It is also known that the raw material, e.g. pulverised wood, can be subjected to a steam or steam pressure treatment to facilitate or make possible the subsequent defibrination by loosening the cell wall bonds. The objective of this process is essentially that of exposing the fibrous structure of the cellulose fraction and supplying it in this form for an application, e.g. for the manufacture of fibre boards or as fodder (CN-PS 933028). Separated associated substances, which are obtained in dissolved form, are mostly destroyed.

It is also known that wood can be subjected to acid hydrolysis to convert the wood cellulose into sugars. This yields a mixture of various sugars, from which it is extremely difficult to isolate the glucose. The hydrolysate obtained is therefore worked up, according to the state of the technique, mainly in an impure form into fodder or alcohol. Enzymatic hydrolysis of wood is not practical.

An object of the present invention is to obtain glucose in a high degree of purity by a simple process from cellulose-containing raw material.

According to the present invention there is provided a process for the production of glucose from cellulose-containing vegetable raw materials which can be disintegrated by steam pressure treatment and defibrination, wherein said raw materials are treated with saturated steam at temperatures of from 160° to 230° C. for a period from 2 minutes to 4 hours, the vegetable raw material disintegrated in this way being lixiviated with an aqueous solution of alkali and wherein fibrinous residue is subjected to acid or enzymatic hydrolysis.

Examples of raw materials used according to the invention are hardwoods, straw, bagasse, grain husks, corncob residues and maize straw. The vegetable raw materials may contain hemicelluloses of various kinds. When vegetable raw materials are used which contain mainly xylans as the hemicelluloses, e.g. those which have a xylan content of more than 15 wt.%, preferably more than 25 wt.%, the xylan and xylan fragments which go into the aqueous phase on lixiviation can be worked up in an advantageous manner and further processed to xylose or xylitol. This process is described in detail in Austrian patent application No. A 5346/76 of July 20, 1976. That application describes a process for obtaining xylan and fibrinous material from xylan-containing vegetable raw materials which can be disintegrated by steam pressure treatment and defibrination, characterised in that the steam pressure treatment is carried out with saturated steam at temperatures of 160° to 230° C. for 2 minutes to 4 hours, the vegetable raw materials disintegrated in this way being lixiviated with an aqueous solution, xylan and xylan fragments from the solution in pure form are separated from monosaccharides and any other impurities and, if desired, the xylans and xylan fragments, possibly still in solution are hydrolysed to xylose and if desired the xylose, also optionally still in solution are reduced in known manner to xylitol.

As stated above, the steam pressure treatment and defibrination which break down the cell bonds of vegetable raw materials are known processes. The treatment, according to the invention is carried out in such a way that chemical decomposition of the products contained in the raw materials is largely avoided. It is therefore undesirable according to the invention to add acids, bases or other chemical substances in the steam pressure treatment. The steam pressure treatment should be as mild as possible in respect of the hemicellulose, in particular xylans and xylan fragments, so that these may be worked up to yield valuable products, for example according to the above-cited patent application.

To solve this problem, it has been found particularly advantageous to carry out the steam pressure treatment at temperatures above about 175° C., preferable above about 180° C., but below about 220° C., preferably below about 200° C. and particularly advantageously in the range of about 185° to 190° C. If the temperature chosen is too high, undesired decomposition of the xylans to monosaccharides may occur. If the temperature is too low, the amount of disintegration may be insufficient or may take too long. To keep the disintegration as mild as possible the duration of the steam treatment should be as short as possible. The maximum duration of the action of steam should preferably be about 60 minutes, more preferably less than about 15 minutes and particularly advantageously in the range or less than about 5 to 8 minutes.

In general, the lower the temperature used the longer should be the duration of treatment. The lower limit for the duration of treatment is essentially determined by the need to achieve disintegration. The times given refer to the duration of the action of steam at the above-quoted temperatures on the starting material.

During the disintegration process acetyl groups are split off from the starting raw material to form molecules of acetic acid. The acetic acid has a beneficial effect on the disintegration. If treatment of the vegetable raw material produces only a small amount of acetic acid, it may be desirable to add further acetic acid, or some other acid, so long as not more than about 6 wt.% of acid, calculated on the absolutely dry raw material, is present. Vegetable raw material disintegrated in this way is lixiviated according to the invention with an alkaline solution. The lixiviation can be carried out in several steps. If it is desired to obtain the hemicelluloses, in particular xylans, it is expedient to carry out the extraction successively with water, possibly repeated several times, and then with an aqueous alkaline solution, likewise possibly repeated several times. It is particularly advantageous and economical to lixiviate the steam pressure treated vegetable raw material whilst it is still hot, since the hot vegetable raw material heats the water or alkali solution used for lixiviation. Hot water or alkali solution may also be used. A substantial proportion of the hemicelluloses, e.g. xylans, is already extracted by water. If it is not desired to obtain the hemicellulose, it is expedient to lixiviate immediately with aqueous alkali solution.

The extract solution can be separated from solid components by known processes, e.g. by filtration, centrifuging, decantation by suction, etc. For this purpose equipment conventionally used for processing of cellulose-containing raw materials may be employed, e.g. vacuum cell filters, worm presses, band presses, displacement centrifuges, etc. The lixiviation can expediently be done on the counter-current principle.

As far as possible the lixiviation of the vegetable raw material should be carried out in such a way as to remove hemicelluloses, their fragments and any other impurities to the greatest possible extent, so that the residue contains the smallest possible amount of sugars or polysaccharides with the exception of cellulose.

Alkalies, in particular caustic soda, are preferable used as the bases for the lixiviation. Caustic soda is cheap and moreover has a swelling effect on the vegetable raw material. Caustic potash may also be used, but is generally dearer. Caustic soda has the further advantage that it can easily be neutralised after use to form products which cause no environmental pollution. The concentration of bases in the lixiviation solution should be as low as possible, since larger amounts of base are uneconomical, have to be neutralised later and are particularly undesirable if the extract solutions are to be further processed, as described in the above-cited, simultaneously filed patent application.

It is therefore preferred that the concentration of base when Na OH is used should not be greater than about 4 wt.%, preferably about 2 wt.%, more preferably not greater than 1 wt.% and most preferably not grater than 0.6 wt.%, calculated on the weight of the lixiviation solution. The lower concentration limit is suitably about 0.1 wt.%, preferably above about 0.2 wt.% and most preferably above about 0.3 wt.%. If other bases are used, the corresponding optimum amounts can be determined by simple experiments.

Preferably, the fibrinous residue obtained after lixiviation of the disintegrated vegetable raw material with the base is washed with water and/or neutralised, so that the purest possible fibrinous residue is obtained, which may then be subjected to acid or enzymatic hydrolysis to produce glucose. Hydrolysis of pure cellulose to glucose by the use of acids or enzymes is a known process. Acids, in particular dilute mineral acids, conventionally used in the art may be used in the practice of the invention. The hydrolysis is preferably carried out according to the invention by the use of enzymes.

Since, in addition to lignin, the fibrinous residue obtained according to the invention contains almost exclusively cellulose, hydrolysis produces practically pure glucose in excellent yield. It is particularly surprising that the fibrinous residue obtained according to the invention can be enzymatically decomposed to glucose in high yield, while wood cannot be enzymatically converted into glucose. Enzymes which decompose cellulose to produce glucose are known. These products may be used for the purpose of the invention. The hydrolysis can be worked up in a known manner to obtain glucose.

An essential technical advance of the process of the invention resides in the fact that no environmentally polluting chemicals are used and that the chemicals employed are used in very low concentration.

In the description and in the examples % means wt.% unless otherwise stated. Isolation and purification of the desired substances present in solution are carried out by the processes usual in sugar chemistry, e.g. by evaporating down the solutions, adding liquids in which the desired product is insoluble or only slightly soluble, recrystallisation, etc.

The following non-limitative examples will serve to illustrate the invention.

EXAMPLE 1: Disintegration process 400 g of red beech in the form of hogged chips, air dried, were treated with steam for 6 to 7 minutes at 185°-195° C., at a pressure of about 12 atm., in the laboratory refiner of Defibrator AG and defibrinated for a about 40 seconds. The wet fibrinous material so obtained was washed out of the Defibrator with a total of 4 l of water and washed on a sieve. The yield of fibrinous material was 83%, calculated on the wood taken (absolutely dry).

The washed and pressed fibrinous material was then suspended in 5 l of 1% aqueous NaOH at room temperature and after 30 minutes separated from the alkaline extract by filtration and pressing. After washing with water, dilute acid and again with water, the yield of fibrinous material was 66%, calculated on the wood taken (absolutely dry). In a similar way, other types of wood, also in the form of coarse saw dust, as well as chopped straw were treated. The mean values of the yields of fibrinous material, calculated on the starting material (absolutely dry) were

| | Fibrinous residue (%) | |
|---|---|---|
| Starting material | After washing with water | after treatment with NaOH |
| Red beech | 83 | 66 |
| Poplar | 87 | 71 |
| Birch | 86 | 68 |
| Oak | 82 | 66 |
| Eucalyptus | 85 | 71 |
| Wheat straw | 90 | 67 |
| Barley straw | 82 | 65 |
| Oat straw | 88 | 68 |

EXAMPLE 2: Carbohydrate composition of fibrinous material

The determination of the carbohydrate composition of the starting materials and fibrinous materials was carried out after total hydrolysis by quantitative sugar analysis in the Biotronic Autoanalyzer (cf. M. Sinner, M.H. Simatupang and H.H. Dietrichs, *Wood Science and Technology* 9 (1975) pp. 307-322.

| | Sugar fractions % calculated on the total carbohydrate fraction. | |
|---|---|---|
| Starting material | glucose | xylose |
| Beech | 62 | 31 |
| fibrin after washing with water | 75 | 21 |
| fibrin after treatment with NaOH | 82 | 15 |
| Oak | 67 | 29 |
| fibrin after washing with water | 81 | 17 |

-continued

| Starting material | Sugar fractions % calculated on the total carbohydrate fraction. glucose | xylose |
|---|---|---|
| fibrin after washing with NaOH | 89 | 9 |
| Eucalyptus | 74 | 22 |
| fibrin after washing with water | 86 | 12 |
| fibrin after treatment with NaOH | 93 | 5 |

EXAMPLE 3: Influence of temperature and alkali concentration on the carbohydrate fractions of the extracts The fibrinous materials of birch and wheat straw, washed only with water, were treated as in Example 1 with aqueous NaOH at various temperatures and concentrations. The individual and total sugars in the extracts were determined as in Example 2.

| | BIRCH | | |
|---|---|---|---|
| | Dissolved carbohydrates | | |
| Extract | Total (% of starting material (abs. dry) | Fraction (% of extract) Xylose | Glucose |
| 1% NaOH | | | |
| Room temp. | 7.3 | 84 | 3 |
| 58° C. | 6.3 | 77 | <3 |
| 78° C. | 4.3 | 74 | <3 |
| 0.5% NaOH | | | |
| Room temp. | 9.1 | 91 | 2 |
| 100° C. | 3.3 | 77 | 3 |
| 0.2% NaOH | | | |
| Room temp. | 4.8 | 84 | 3 |
| 100° C. | 3.8 | 82 | 3 |

| | WHEAT STRAW. | | |
|---|---|---|---|
| | Dissolved carbohydrates | | |
| Extracts with 1% NaOH | Total (% of starting material, abs. dry) | Fraction (% of extract) Xylose | Glucose |
| Room temp. | 7.1 | 81 | 4 |
| 56° C. | 9.5 | 79 | 4 |
| 63° C. | 9.9 | 79 | 5 |
| 80° C. | 7.9 | 77 | 4 |

EXAMPLE 4: Acid hydrolysis of fibrinous materials 300 mg portions of fibrinous material of oak and eucalyptus, obtained as in Example 1, treated with alkali solution, were, in the usual manner for total hydrolysis, (cf. J. F. Saeman, W. E. Moore, R. L. Mitchell and M. A. Millet, Tappi 37 (1954), 336–343) mixed with 3 ml. of conc. $H_2SO_4$ with cooling, incubated for 60 min. at 30° C., diluted with 84 ml of water and heated for 60 min. at 120° C.

After this treatment, the solutions contained about 70% monosaccharides, calculated on the fibre taken. Quantitative sugar analysis of the solutions (cf. Example 2) gave for oak a glucose fraction of 89% and for eucalyptus 93%. FIG. 1 shows on the right the sugar chromatogram of the fibrin hydrolysate of oak and on the left, that of eucalyptus.

EXAMPLE 5: Enzymatic hydrolysis of fibrins

The starting materials were the fibrinous material of oak, obtained as in Example 1 by treatment with 1% NaOH and washing and the fibrinous residue of birch obtained as in Example 3 by treatment with 0.5% NaOH at room temperature and washing, after drying in the conditioning room (mean residual moisture 10 wt.%).

200 mg portions of these fibrinous residues were incubated in 5 ml of 0.1 m sodium acetate buffer at pH 4.8 in stoppered Erlenmeyer flasks at 46° C. in a shaking water bath with 25 mg of a product obtained by dialysis and subsequent freeze drying from the commercial enzyme preparation Onozuka SS (All Japan Biochemicals Co., Nishinomiya, Japan). Thimerosal (28 mg/l) was added to the solutions to inhibit growth of microorganisms. Two samples with enzyme and 1 sample without enzyme (control) of each were incubated. The decomposition was followed by quantitative sugar analysis (cf. Example 2). After 24 hours incubation, the remaining residue was separated by suction on a sintered filter (G3), dried and weighed. The final decomposition was additionally measured by determination of the carbohydrate which had passed into solution (in the filtrate) by means of orcin-sulphuric acid (cf. M. Sinner, N. Parameswaran, H. H. Dietrichs and W. Liese, Holzforschung 27 (1973), 36–42.

Figure 2:
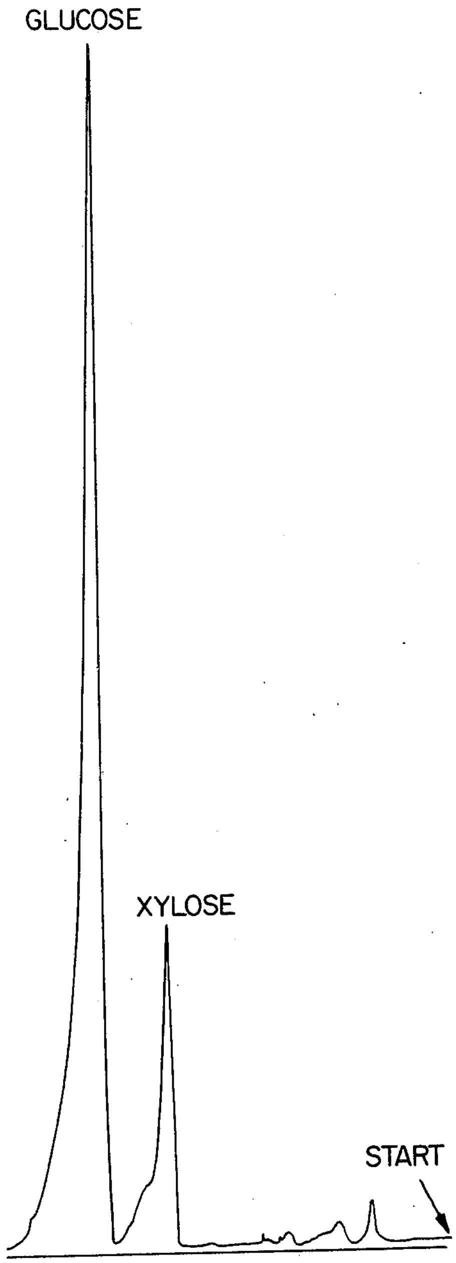

After an incubation period of 2.25 hours the oak fibrin had been converted on average to the extent of 17% into soluble monomeric and oligomeric sugars: the corresponding value for birch was 18%. The mean end decomposition value for oak was 24% and for birch was 42%. The sugar chromatograms of the end decomposition solutions contained only monosaccharides, viz. glucose and xylose. The ratio of glucose to xylose corresponded approximately to that obtained by acid hydrolysis. With the enzymatically degraded oak fibrin the glucose fraction was 84% and with the birch fibrin 81%. FIG. 2 is the sugar chromatogram of the end decomposition solution of oak. It is similar to the chromatogram of the sulphuric acid oak fibrin hydrolysate of Example 4 (FIG. 1).

Taking into account the lignin content of the fibrinous material, 22 to 24%, it is found that the carbohydrates, which consist mainly of cellulose (cf. Example 2), were converted to the extent of up to about 54% into sugars, mainly glucose.

The process described in this example was repeated with another charge of birch and with wheat straw. It was found that the above-mentioned end decomposition values after 24 hours were 51% for birch and 62% for wheat straw, calculated on the amount of fibrinous residue taken. When the enzyme treatment, i.e. the incubation, was extended to 48 hours, the values obtained were 62% and 66% by weight respectively.

After total hydrolysis the residues from the enzyme treatment contained less than 10% carbohydrate in relation to the fibrinous material used; xylose predominated and glucose was only present in very small quantities (For hydrolysis and sugar analysis cf. Example 2). This means that the cellulose of the fibrinous materials was almost completely saccharified to glucose by means of the enzyme treatment.

What is claimed is:

1. A process for the production of glucose from cellulose-containing vegetable raw material which can be disintegrated by steam pressure treatment and defibrination consisting essentially of the steps of (a) treating cellulose-containing vegetable raw material with saturated steam at temperatures of from about 160° to 230° C. for a period of from about 2 minutes to about 4 hours to disintegrate the raw material, (b) lixiviating the disintegrated raw material with an aqueous solution of alkali to leave a fibrinous residue, and (c) subjecting the fibrinous residue to acid or enzymatic hydrolysis under conditions to produce glucose.

2. Process according to claim 1 wherein the lixiviation of the disintegrated raw material is conducted in several steps.

3. Process according to claim 2, wherein the lixiviation is carried out successively with water and with an aqueous alkali solution.

4. Process according to claim 3, wherein the alkaline lixiviation is carried out in a solution containing from 0.1 to 4 wt.% NaOH.

5. Process according to claim 1, wherein the fibrinous residue obtained after lixiviation of the disintegrated vegetable raw material is washed with water or neutralised.

6. The process according to claim 1 wherein the fibrinous residue obtained after lixiviation of the disintegrated vegetable raw material is washed with water and neutralized.

* * * * *